United States Patent [19]

Steitz et al.

[11] Patent Number: 5,125,002
[45] Date of Patent: Jun. 23, 1992

[54] FURNACE ELECTRODE PROTECTOR

[75] Inventors: William R. Steitz, Toledo; Richard C. Carle, Grand Rapids, both of Ohio

[73] Assignee: Toledo Engineering Co., Inc., Toledo, Ohio

[21] Appl. No.: 637,819

[22] Filed: Jan. 7, 1991

[51] Int. Cl.$^5$ ............................................. C03B 5/027
[52] U.S. Cl. .................................... 373/37; 373/36; 373/38; 373/52; 373/54; 373/55; 373/94; 373/95; 373/96
[58] Field of Search ...................... 373/36, 37, 38, 88, 373/93, 94, 95, 96, 52, 54, 55

[56] References Cited

U.S. PATENT DOCUMENTS

| | | | |
|---|---|---|---|
| 146,750 | 1/1874 | Colby | 227/115 |
| 983,793 | 7/1908 | Gately | 227/115 |
| 1,314,603 | 9/1919 | Mott | 428/634 |
| 1,331,015 | 2/1920 | Kaye | 53/271 |
| 2,443,187 | 6/1948 | Hobbs | 285/86 |
| 2,978,526 | 4/1961 | Olson | 13/14 |
| 3,305,619 | 2/1967 | Molstedt et al. | 373/37 |
| 3,327,040 | 6/1967 | Molstedt et al. | 13/20 |
| 3,341,648 | 9/1967 | Molstedt et al. | 13/20 |
| 3,375,314 | 3/1968 | Sinner | 13/6 |
| 3,384,697 | 5/1968 | Fouse | 373/37 |
| 3,391,236 | 7/1968 | Blumenfeld | 373/37 |
| 3,409,725 | 11/1968 | Penberthy | 13/6 |
| 3,634,588 | 1/1972 | Steitz | 373/37 |
| 3,690,682 | 9/1972 | Ferrill | 277/102 |
| 3,736,109 | 5/1973 | Darling et al. | 29/195 |
| 3,740,445 | 6/1973 | Charlsworth | 13/6 |
| 3,777,040 | 12/1973 | Gell et al. | 373/37 |
| 3,967,047 | 6/1976 | Long et al. | 13/6 |
| 4,287,380 | 9/1981 | Fairbanks et al. | 13/6 |
| 4,289,317 | 9/1981 | Kuc | 277/1 |
| 4,468,783 | 8/1984 | Bauer et al. | 373/93 |

FOREIGN PATENT DOCUMENTS 769428  3/1957  United Kingdom ............. 373/37

Primary Examiner—Bruce A. Reynolds
Assistant Examiner—Tu Hoang
Attorney, Agent, or Firm—Hugh Adam Kirk

[57] ABSTRACT

A sealed connection for a sleeve and jacket for protecting a molybdenum electrode mounted through the wall of an electric glass furnace. Around the electrode in the wall is a stainless steel sleeve coated on the inside with a fused alumina and having an outwardly extending flange at its outer end which engages the outer wall or shoulder in the aperture in the wall through which the electrode extends. The flange has an axially outwardly extending rib of V-shaped radial cross-section which seats and centers in an annular V-shaped groove around the inner end of a water jacket that surrounds the electrode outside the furnace. Refractory sealing gaskets are placed between the flange and the wall of the furnace and in the cooperating grooves and ribs of the sleeve and water jacket. The sealed cylindrical annular space around the electrode between it and the sleeve and the jacket is filled with nitrogen to prevent oxidation of the molybdenum electrode. The water jacket and sleeve are urged together and against the outer wall of the furnace by an adjustable mounting. The electrode is separately and adjustably mounted so that as the electrode wears away inside the furnace, more of it can be easily fed into the furnace.

6 Claims, 2 Drawing Sheets

FURNACE ELECTRODE PROTECTOR

BACKGROUND OF THE INVENTION

This invention is an improvement over applicants' assignee's U.S. Pat. No. 3,634,588 issued Jan. 11, 1972 to Steitz et al and U.S. Pat. No. 3,777,040 issued Dec. 4, 1973 to Gell et al.

Although electrodes of this type with ceramic-coated metal sleeves and water jackets are known according to the above mentioned patents, neither of these patents include the specific improved coating, sealing and centering means for the sleeve and jacket invented and disclosed herein by applicants.

SUMMARY OF THE INVENTION

Generally speaking, this invention relates to the protection of molybdenum electrodes extending through the wall of a glass furnace for melting glass according to the joule effect. These electrodes may be mounted on adjustable jacks so they can be fed periodically into the furnace as the electrodes wear during operation of the furnace.

Separately mounted and surrounding each molybdenum electrode to prevent its oxidation, is a protective sleeve and adjacent cooling jacket centered with each other and the electrode to provide an annular cylindrical space around the electrode in the furnace wall, which space can be maintained in an inert atmosphere, such as nitrogen. This sleeve is composed of stainless steel and is positioned inside the wall of the furnace extending toward the molten glass in the furnace. The other or outer end of this sleeve has an integral outwardly radially extending flange. Sealingly connected to this flange is the inner end of a jacket which also surrounds the electrode and which contains a labyrinth path for a cooling fluid. This flange on the sleeve is provided with a rib having tapered sides extending axially from the flange toward the outside of the furnace. This rib seats in a groove having tapered sides at the adjacent end of the cooling jacket. Thus, as the jacket is axially moved to engage the flange on the sleeve, the complimentary radially triangular cross-sections of the rib and groove center the jacket and sleeve with each other and the electrode.

Between the flange and the wall of the furnace and between the rib and groove, there are provided refractory gaskets for sealing sleeve and jacket together and to the furnace wall as the jacket is urged against the flange of the sleeve. The inner end of the sleeve is sealed to the electrode by the molten glass in the furnace that flows into the aperture for the electrode.

The inside of the stainless steel sleeve is fuse-coated with aluminum oxide to prevent the high temperature of the glass in the furnace from forming an alloy with the molybdenum in the electrode and thus welding the sleeve to the electrode. This fuse-coated alumina coating has a high wear and abrasion resistance of about ten times that of the uncoated metal sleeve and provides a thermal barrier for temperatures up to 2480° C. In addition, this alumina coating has a high electrical resistance as well as a high corrosive resistance to resist action of oxides, acids and alkalies. Preferably in order to improve the adherence of this coating to the stainless steel sleeve, there may be a sub-or undercoating of a nickel-chrome alloy which also compensates for the difference in thermal expansion between the alumina coating and the stainless steel sleeve. Thus, the only seal at the inside of the electrode and sleeve will be the molten glass of the furnace that extends into the aperture in the furnace to the upper inner end of the metallic sleeve.

At the outer end of the cooling jacket, there is provided a gasket for sealing the cooler parts of the electrode and jacket together. Thus a closed annular cylindrical space is provided for the inert gas adjacent the heated parts of the electrode. An adjustable bracket is provided for urging and holding the jacket against the sleeve and the sleeve against the furnace once they are in position, which bracket may be connected to the support for the furnace.

Although water is generally employed for circulating through the cooling jacket, other cooling liquids may be employed without departing from the scope of this invention. Furthermore, if additional cooling is required, jets of air may be applied to the outside of the jacket and electrode outside the furnace.

OBJECTS AND ADVANTAGES

An object of this invention is to provide an improved, simple, efficient, effective and economic means of centering, aligning and sealing a jacket and sleeve for surrounding and protecting an electrode in a furnace.

Another object is to provide an interfitting structure between a cooling jacket and a sleeve that surrounds and protects an electrode extending through an aperture in a furnace wall which permits a greater degree of sealing, reliability and proper positioning of the jacket and sleeve around such an electrode.

Another object is to provide a sealed inert atmosphere around an electrode to prevent its reaction with a protective sleeve and jacket around the electrode, particularly at the higher temperature closer to the inside of the furnace, thereby preventing sticking of the sleeve to the electrode and/or jacket.

A further object is to provide a high temperature, abrasion, wear, electrical, and corrosion resistant coating on the inside of the metal sleeve that surrounds the electrode in the wall of the furnace, thereby further protecting the electrode, particularly if the electrode becomes chemically reactive at its operating temperature.

BRIEF DESCRIPTION OF THE VIEWS

The above mentioned and other features, objects and advantages, and a manner of attaining them, are described more specifically below by reference to an embodiment of this invention shown in the accompanying drawings wherein.

DETAILED DESCRIPTION OF PREFERRED EMBODIMENT

Figure 1:
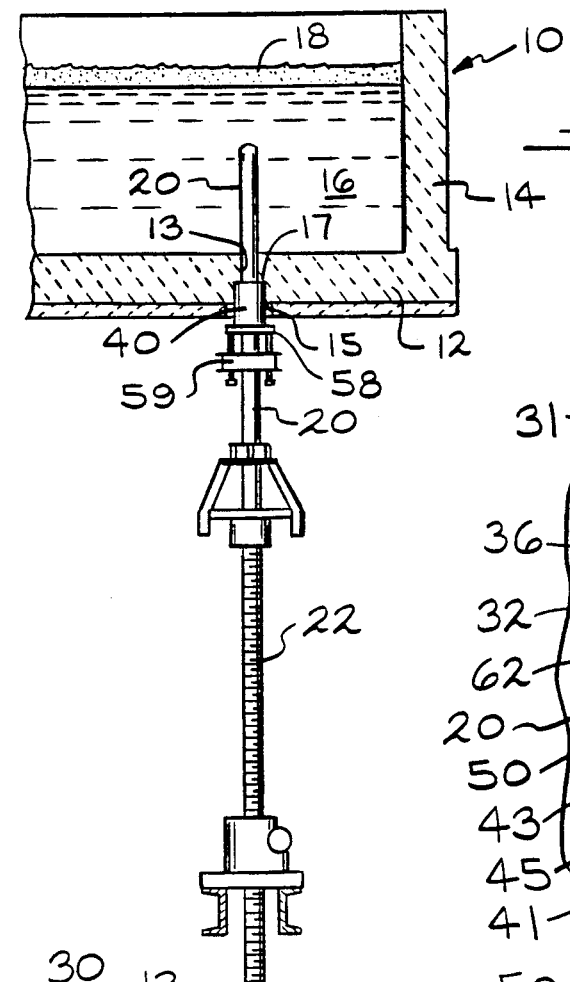
FIG. 1 is a vertical section of a part of a joule-type glass furnace showing means for mounting an electrode and its surrounding jacket outside the furnace.

Referring first to FIG. 1, there is shown a section of part of an electric glass furnace 10 having a bottom wall 12 and side wall 14 filled with molten glass 16, on the top of which molten glass is a layer of unmelted glass particles 18. Projecting through the bottom wall 12 is an aperture 13 which herein is shown to have an outward enlarged portion 15 providing a shoulder 17. However, it is to be understood that the shoulder 17 may comprise the outer surface of the wall 12, or another shoulder 19 shown in FIG. 2.

Projecting through the aperture 13 and 15 there is shown an electrode 20 which may be composed of a high refractory electrical conducting material, such as graphite, molybdenum, or the like. The length of the electrode is preferably longer than the portion that is exposed into the molten glass 16. The outer end of this electrode is mounted on a jack 22 so that is can be gradually fed into the molten glass 16 in the furnace as its upper ends wears away due to the high temperature and electrolysis in the furnace.

Figure 2:
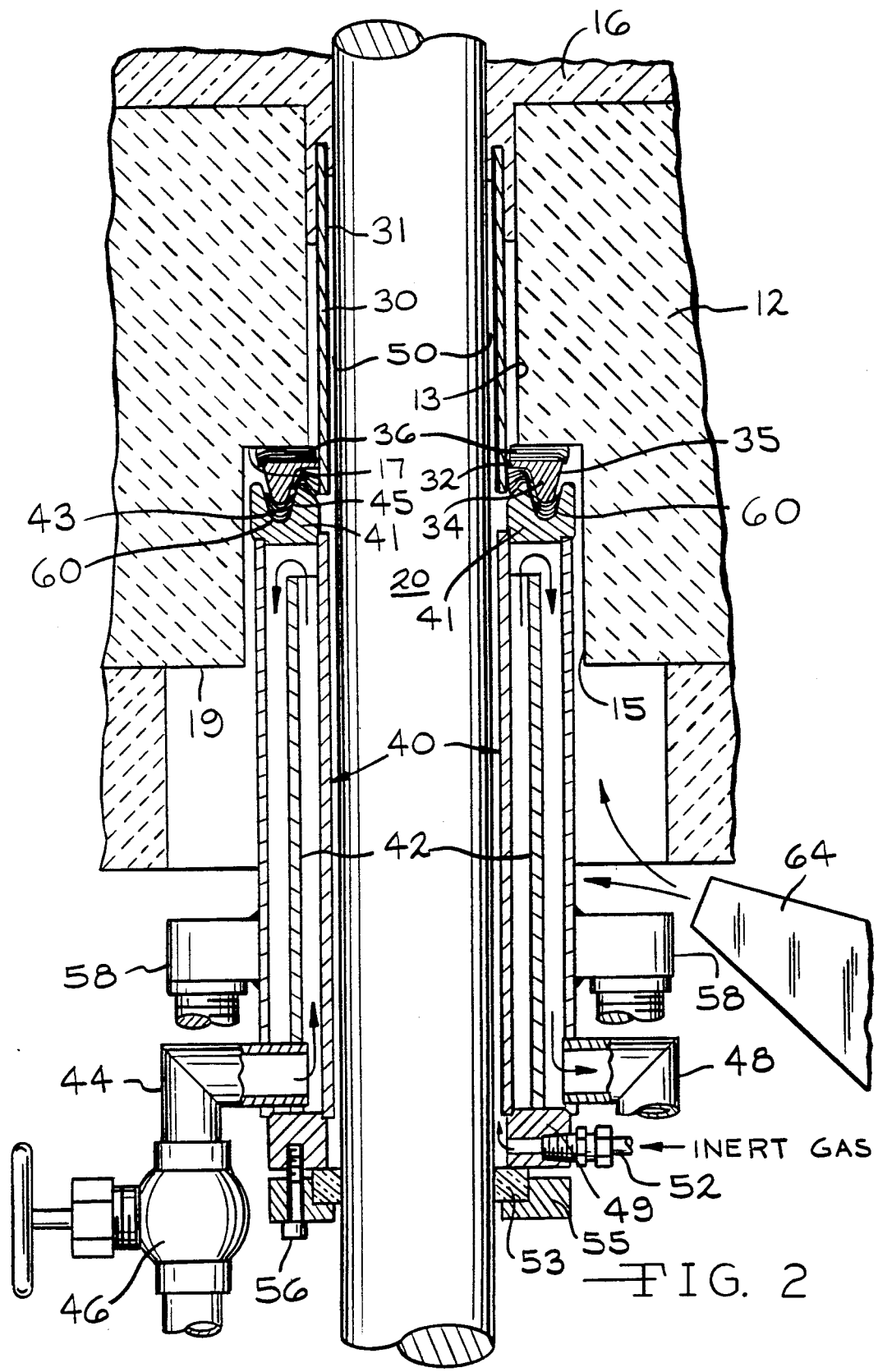
FIG. 2 is an enlarged vertical sectional view of the electrode through the wall of a furnace shown in FIG. 1 showing the flanged and inside coated sleeve and the cooling jacket, and the seal connection between them and the furnace wall and to the electrode.

Referring now more specifically to FIG. 2, there is shown a stainless steel sleeve 30 which may be composed of a high temperature resistant steel such as Inconel 600, which is a nickel-chromium-iron alloy.

The inside of the hollow cylindrical sleeve 30 is fused-coated with aluminum oxide 31 so that at its inner end adjacent the molten glass 16, it will not tend to melt and form an alloy with the molybdenum in the electrode 20 by welding or sticking thereto, and thus resist adjustment of the electrode. This aluminum oxide coating is flame-sprayed on the inside of the tube, such as by an oxygen acetylene flame in a spray gun backed up by air pressure to blow out the melted particles of the aluminum oxide at a speed of about 180 meters per second. Then melted alumina particles are deposited and integrally adhere to the inside of the sleeve 30. This pure aluminum oxide coating has a wear and abrasion resistance of about 20 times that of the metal sleeve per se, and provides a thermal barrier to temperatures up to 2480° C. Furthermore, since this is an electric furnace, this coating has a high electrical resistance, as well as a high corrosion resistance to oxides, acids and alkalis. The relative thickness of this aluminum oxide coating ranges between about 0.25 and 0.635 millimeters and preferably between about 0.35 and 0.40 millimeters. Furthermore, in order to improve the adherence of this coating 31 to the stainless steel sleeve 30, there may be provided a thin subcoating under the aluminum oxide on the inside of the tube 30, such as of a nickel-chromium alloy which also may be sprayed on the inside of the tube 30. This undergoing reduces the difference in thermal expansion between that of the ceramic aluminum oxide coating 31 and that of the stainless steel sleeve 30. The thickness of this undercoating usually ranges between about 0.025 and 0.125 millimeters, and preferably between about 0.05 and 0.075 millimeters.

The inner end of this sleeve 30 is sealed to the furnace 12 and the electrode 20 by the molten glass 16 as more clearly shown in FIG. 2.

Figure 3:
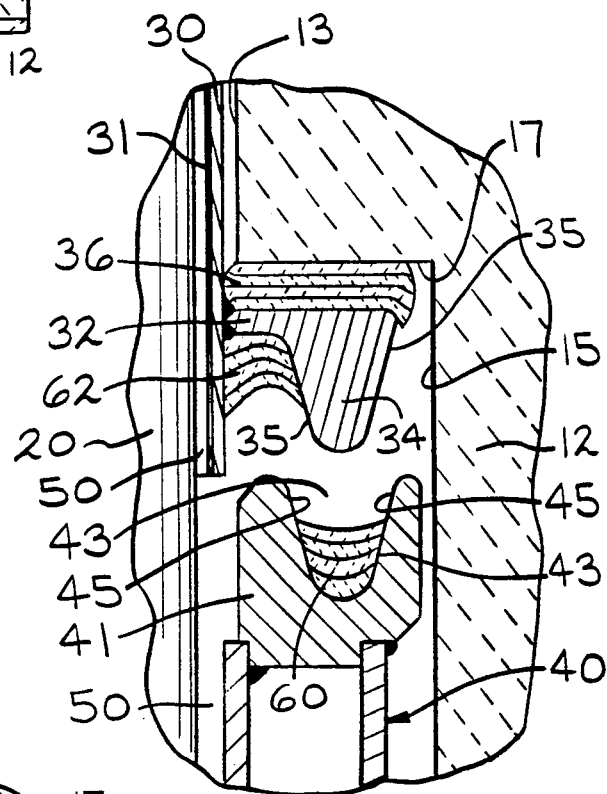
FIG. 3 is a further enlarged sectional view of the interfitting rib and groove of the sleeve and jacket, respectively, before being centered with respect to each other.
Figure 4:
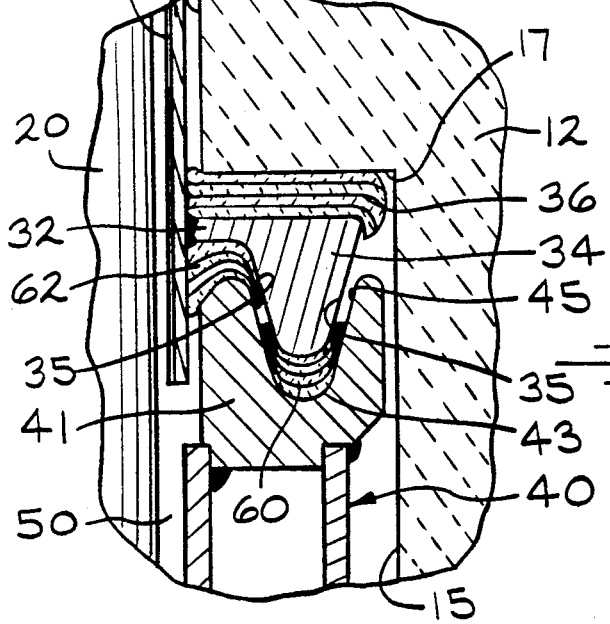
FIG. 4 is a view similar to FIG. 3, but with the jacket and sleeve flange centered and sealingly connected together.

The outer end of this sleeve 30 is provided with an integral radially outwardly extending flange 32, which flange contains an axially extending annular rib 34 toward the outside of the furnace 10. This rib 34 has a general triangular radial cross-section; that is, a rib with tapered sides 35. The lower end of the sleeve 30 is sealed to the outer wall of the furnace, particularly herein to the shoulder 17, by a gasket 36 which is squeezed between the flange 32 and shoulder 17 of the outer side of the wall 12 of the furnace 10. Also surrounding the electrode 20 and toward the outside of the furnace wall 12 is provided a cooling jacket or water box 40 which in FIG. 2 is shown to have a partial concentric internal partition 42 to provide a labyrinth path for the introduction of the cooling fluid, such as water, from pipe 44 regulated by a valve 46. The fluid or water flows from intake pipe 44 adjacent and around the inner wall of the jacket 40, then around the inner end of the partition 42 and around the inside of the outer wall of the jacket 40 to the outlet duct 48. The inner end of the jacket 40 is provided with a ring 41 having an annular groove 43 with tapered sides 45 which are parallel to the tapered sides 35 of the rib 34 on the sleeve 30. The congruence of the tapered sides 35 of the rib 34 and the tapered sides 45 of the groove 43 are so located with respect to each other and the electrode 20 so when they are fitted together from the position shown in FIG. 3 to that shown in FIGS. 2 and 4, the sleeve 30 and jacket 40 are coaxially aligned and centered around the electrode 20 and its centerline. This positioning provides an enclosed continuous annular cylindrical space 50 around the electrode 20, and between it and the sleeve 30 and the jacket 40. This annular cylindrical space 50 is filled with an inert gas such as nitrogen, which is introduced thereinto from the closing ring 49 at the outer end of the jacket 40. In order to maintain an inert atmosphere in the cylindrical space 50, there is a connection 52 through the ring 49 to the space 50 from an inert gas supply. The particular cooperating shapes of the rib 34 and groove 43 insure the centering and uniformity of the spaces 50. Since the outside of the lower end of the jacket 40 is not at a high temperature, the outer seal 53 between the jacket 40 and the electrode 20 may be a normal pressable gasket urged into place by an additional ring 55 and bolts 56. Attached to the outside of the jacket 40 are brackets 58 through which the jacket is held in place as shown in FIGS. 2 and 4. These brackets 58 may be adjustably anchored to a beam 59 (see FIG. 1), which beam also may be a support for the furnace 10.

In the bottom of the groove 43 there is provided a refractory gasket 60 for sealing the connection between the sleeve 30 and jacket 40. In addition to the gasket 60, or as an integral part thereof, there is an additional gasket 62 in the groove formed between the inner edge of the groove 43 and the groove formed between the sleeve and the rib 34 for providing a second seal between the sleeve 30 and jacket 40. These gaskets 36, 60 and 62 are of a refractory material which can withstand temperatures up to 2300° F., such as for example Fiberfrax 970 comprised primarily of aluminum and silica fibers.

If additional cooling is required, an air jet 64 (see FIG. 2) may also be directed onto the outside of the jacket 40 and adjacent electrode 20.

Although specific compositions have been described for the electrode 20, sleeve 30, inert gas, gaskets 36, 60 and 62, and cooling fluids for the jacket 40, and jet 64, it should be clearly understood that other materials may be used for the parts for the protection of the electrodes 20 without departing from the scope of this invention.

While there is described above the principles of this invention in connection with specific apparatus, it is to be clearly understood that this description is made only by way of example and not as a limitation to the scope of this invention.

We claim:

1. An electric furnace having a wall with an aperture therethrough,
   A) an electrode extending through said aperture,
   B) a stainless steel sleeve around said electrode in said aperture and having an outwardly projecting flange with a tapered rib parallel to said electrode and extending in a direction away from said furnace and forming a first groove between said rib and said sleeve,
   C) a fused aluminum oxide coating sintered on the inside of said sleeve,
   D) a gasket between said flange and said wall,
   E) a cooling jacket around said electrode having a tapered and second groove adjacent and congruent with said rib for centering and seating said jacket with said sleeve and said electrode,
   F) separate gasket means in both of said grooves for forming a double seal between said sleeve and said gasket,
   G) adjustable means outside said furnace for supporting said electrode, and
   H) means for urging and holding said jacket and sleeve centered and sealed together and said sleeve sealed against said wall of said furnace.

2. A furnace according to claim 1 wherein said alumina coating has an undercoating.

3. A furnace according to claim 1 wherein said alumina coating has a thickness of between 0.25 and 0.635 millimeters.

4. A furnace according to claim 1 wherein said thickness is between 0.35 and 0.040 millimeters.

5. A furnace according to claim 2 wherein said undercoating has a thickness of between 0.025 and 0.125 millimeters.

6. A furnace according to claim 5 wherein said thickness of undercoating is between 0.05 and 0.075 millimeters.

* * * * *

UNITED STATES PATENT AND TRADEMARK OFFICE
CERTIFICATE OF CORRECTION

PATENT NO. :     5,125,002

DATED     :      June 23, 1992

INVENTOR(S) :    William R. Steitz and Richard C. Carle

It is certified that error appears in the above-identified patent and that said Letters Patent is hereby corrected as shown below:

Column 3, line 54, change "undergoing" to - - undercoating - - .

Signed and Sealed this

Twenty-fourth Day of August, 1993

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,125,002
DATED : June 23, 1992
INVENTOR(S) : William R. Steitz et al It is certified that error appears in the above-indentified patent and that said Letters Patent is hereby corrected as shown below:

Column 6, line 14, change "1" to -- 3 --
Column 6, line 15, change "0.040" to -- 0.40 --

Signed and Sealed this

First Day of November, 1994

Attest:

BRUCE LEHMAN

Attesting Officer

Commissioner of Patents and Trademarks